(12) United States Patent
Daniel et al.

(10) Patent No.: US 10,232,946 B2
(45) Date of Patent: Mar. 19, 2019

(54) AIRCRAFT TRAY TABLE DRAWER

(71) Applicant: B/E Aerospace, Inc., Winston-Salem, NC (US)

(72) Inventors: Darryl D. Daniel, Pflugerville, TX (US); Alexander N. Pozzi, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/938,683

(22) Filed: Mar. 28, 2018

(65) Prior Publication Data
US 2018/0281968 A1 Oct. 4, 2018

Related U.S. Application Data

(60) Provisional application No. 62/478,643, filed on Mar. 30, 2017.

(51) Int. Cl.
*B64D 11/06* (2006.01)

(52) U.S. Cl.
CPC ...... *B64D 11/0638* (2014.12); *B64D 11/0605* (2014.12); *B64D 11/0636* (2014.12)

(58) Field of Classification Search
CPC ............ B64D 11/0638; B64D 11/0605; B64D 11/0636
See application file for complete search history.

(56) References Cited

U.S. PATENT DOCUMENTS

| | | | | |
|---|---|---|---|---|
| 7,281,762 B1 * | 10/2007 | Getfield | ................. | B60N 3/004 297/163 |
| 7,806,305 B1 * | 10/2010 | Moore, Jr. | ................ | A45F 5/00 108/43 |
| 8,596,206 B2 * | 12/2013 | Legeay | .................. | B60N 3/002 108/137 |
| 2012/0032479 A1 * | 2/2012 | Suhre | ..................... | B60N 3/102 297/188.01 |
| 2012/0167807 A1 * | 7/2012 | Legeay | .................. | B60N 3/002 108/41 |
| 2013/0307394 A1 * | 11/2013 | Dondurur | .............. | A47B 88/90 312/348.3 |
| 2014/0035330 A1 * | 2/2014 | Henshaw | ............... | B60N 3/002 297/174 R |
| 2014/0167457 A1 * | 6/2014 | Schultheis | ............. | B64D 11/06 297/162 |
| 2015/0284090 A1 * | 10/2015 | Stephens | ............ | B64D 11/0638 297/163 |

(Continued)

FOREIGN PATENT DOCUMENTS

EP 1683719 A1 * 7/2006 ............. B64D 11/06

*Primary Examiner* — Daniel J Rohrhoff
(74) *Attorney, Agent, or Firm* — Clements Bernard Walker PLLC

(57) ABSTRACT

A passenger seat module, a tray table deployable from within the module, and a drawer deployable from within the tray table. The tray table drawer is accessible regardless of the stowed or deployed position of the tray table to provide a stowage solution independent of tray table deployment. A module adapted to be positioned in proximity to a passenger seat and including a tray table coupled to the module through a support arm, the tray table movable between a stowed position within the module and a deployed position outside of the module.

11 Claims, 3 Drawing Sheets

(56) References Cited

U.S. PATENT DOCUMENTS

2016/0376008 A1* 12/2016 Kuyper ................. A47B 5/006
                                                                     244/122 R
2017/0369173 A1* 12/2017 Lee ..................... B64D 11/0638
2018/0281967 A1* 10/2018 Stephens ............ B64D 11/0638

\* cited by examiner

AIRCRAFT TRAY TABLE DRAWER

RELATED APPLICATION AND INCORPORATION BY REFERENCE

This application claims priority from U.S. Application No. 62/478,643 filed Mar. 30, 2017, the entirety of which is incorporated by reference herein.

BACKGROUND

The inventive concepts disclosed herein relate generally to tray tables, and more particularly, to deployable tray tables equipped with a storage drawer, as well as a passenger seat module from which the tray table deploys.

Aircraft tray tables commonly deploy from against a seatback or from alongside a passenger seat, such as from within an armrest or console. Tray tables are typically configured to move between a stowed position for taxi, take-off and landing, and a deployed position for use during flight. Stowed tray table orientations may be vertical or near vertical against a seatback or within an armrest housing. Deployed tray table orientations may be horizontal with the tray table positioned directly forward of or alongside a seated passenger. Some tray tables may have intermediate positions to facilitate seat ingress and egress without having to fully stow the tray table.

Stowage space aboard aircraft is limited, particularly for small items used during flight and personal items carried aboard. Stowage is conventionally provided in seatback pockets in the case of economy class seating, and seat consoles in the case of premium class seating. Regardless of the seating class, there is a need for stowing small items to be used during flight, for example, dining and writing implements, condiments, electronic devices, headphones, etc. It would be desirable to provide stowage space in an aircraft for routine passenger use items, among others, to alleviate the need for stowing these items elsewhere and to provide such items directly to passengers without having to request them from the flight crew, among other uses and advantages.

SUMMARY

In one aspect, embodiments of the inventive concepts disclosed herein are directed to a tray table assembly including a tray table adapted to be coupled to a support arm including a table top and a bottom interconnected through a perimeter sidewall so as to provide an internal compartment within the tray table, an opening through the perimeter sidewall providing access to the internal compartment, and a drawer disposed in the internal compartment movable between a stowed position within the internal compartment and a deployed position outside of the internal compartment.

In another aspect, the drawer may include a bottom, a perimeter sidewall, an open top, and a plurality of internal dividers dividing an interior volume of the drawer into separate compartments.

In a further aspect, the perimeter sidewall of the drawer may include a front wall including a handle for manipulating the drawer between the stowed and deployed positions of the drawer.

In a further aspect, the front wall may align flush with the perimeter sidewall of the tray table when the drawer is in the stowed position thereof.

In a further aspect, an end of the support arm opposite the tray table may be adapted to be coupled to a passenger seat module comprising an elongate recess within which the tray table assembly stows in a stowed position of the tray table.

In a further aspect, in a stowed position of the tray table the drawer may deploy in a first direction, and in a deployed position of the tray table the drawer may deploy in a second direction perpendicular to the first direction.

In a further aspect, the drawer may slide horizontally between the stowed and deployed positions of the drawer.

In another aspect, embodiments of the inventive concepts disclosed herein are directed to a passenger seat module assembly including a module adapted to be positioned in proximity to a passenger seat, a support arm coupled at one end to the module, a tray table coupled to the support arm and including a table top and a bottom interconnected through a perimeter sidewall so as to provide an internal compartment within the tray table, the tray table movable between a stowed position within the module and a deployed position outside of the module, an opening through the perimeter sidewall of the tray table providing access to the internal compartment, and a drawer disposed in the internal compartment, the drawer movable between a stowed position within the internal compartment and a deployed position outside of the internal compartment.

In another aspect, the drawer may include a bottom, a perimeter sidewall, an open top, and a plurality of internal dividers dividing an interior volume of the drawer into separate compartments.

In a further aspect, the perimeter sidewall of the drawer may include a front wall including a handle for manipulating the drawer between the stowed and deployed positions of the drawer.

In a further aspect, the module may include an elongate recess accessible through a side of the module, the elongate recess housing the tray table therein when the tray table is in the stowed position, and wherein a front face of the drawer may be oriented parallel to the side of the module such that the drawer is configured to open when the tray table is in the stowed and deployed positions of the tray table.

In a further aspect, the tray table may rotate 90 degrees between the stowed and deployed positions of the tray table.

In a further aspect, the module may include a compartment disposed in a top of the module accessible through a hinged door.

In a further aspect, in the stowed position of the tray table the drawer may deploy in a first direction, and in the deployed position of the tray table the drawer may deploy in a second direction perpendicular to the first direction.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

The inventive concepts disclosed herein are generally directed to a passenger seat module, a tray table deployable from within the module, and a drawer deployable from within the tray table. The drawer and contents therein are accessible regardless of the stowed or deployed position of the tray table such that the passenger can access the drawer and contents regardless of the position of the tray table. The drawer can hold airline-provided articles such as implements and/or passenger articles carried aboard. The articles can be articles typically associated with try table use, for example, dining and working.

The tray table can be coupled to a support arm or like mechanism for transition tray table between a fully stowed, a fully deployed, and intermediate positions of the tray table, as well as stably support the tray table in a horizontal orientation during and after deployment. The support arm can guide the tray table for horizontal deployment, and the support arm can be pivotably coupled to at least one of the passenger seat module and the tray table such that the tray table rotates as the tray table transitions between the stowed and deployed positions. The tray table can be made of plastic or other durable and lightweight materials commonly used aboard aircraft.

Figure 1:
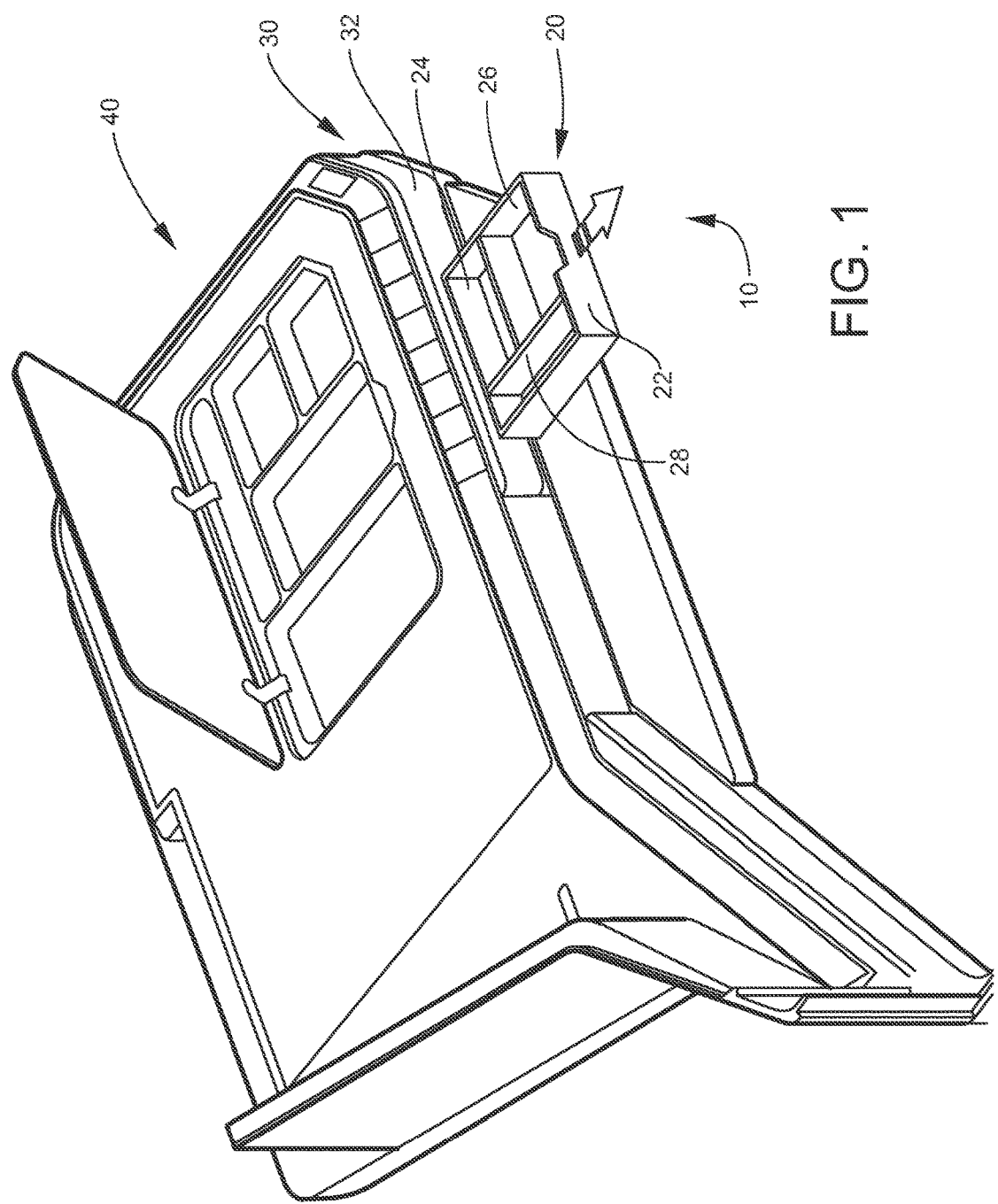
FIG. 1 is a perspective view of a passenger seat module showing a stowed tray table and deployed tray table drawer.

In an exemplary embodiment, FIG. 1 illustrates a tray table drawer 20 associated with a tray table assembly 30 deployable from within a passenger seat module 40. The passenger seat module 40 is adapted to be positioned in proximity to a passenger seat, for example, an aircraft passenger seat. The module 40 can be positioned forward of or alongside the passenger seat and serves to support the needs and uses of a passenger. The module 40 may function as an armrest and/or tabletop, among other functions.

The tray table drawer 20 includes a bottom 26, a perimeter sidewall 24, an open top, and a plurality of internal dividers 28 arranged to divide an interior volume of the drawer into separate compartments. The perimeter sidewall 24 of the drawer 20 includes a front wall 22 defining a handle for manipulating the drawer between stowed and deployed positions of the drawer 20. The drawer 20 stows within an internal compartment in the tray table 30 and is movable between a stowed position within the internal compartment and a deployed position outside of the internal compartment. An opening through a perimeter sidewall 32 of the tray table provides access to the internal compartment that stows the drawer 20.

Figure 2:
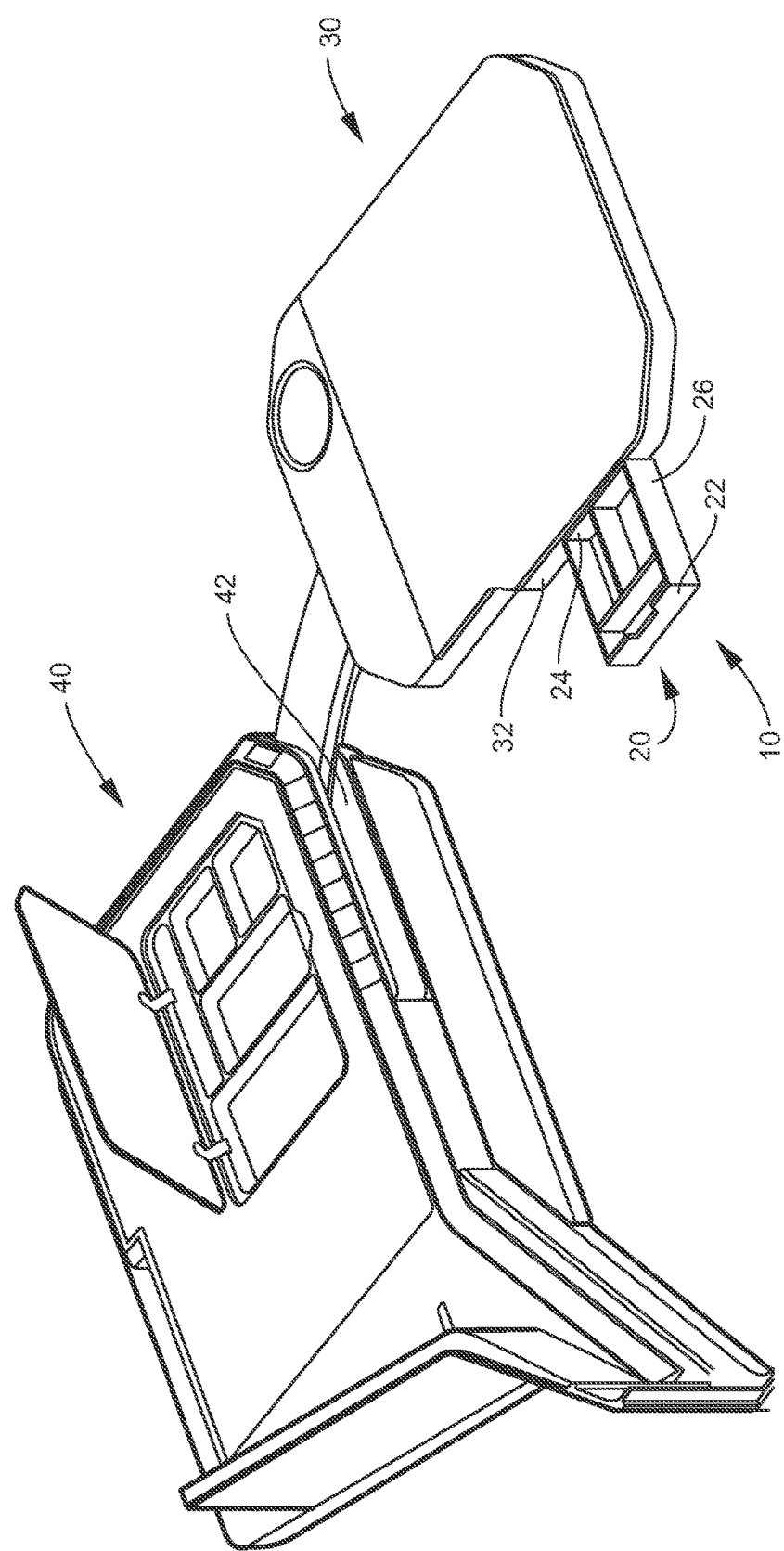
FIG. 2 is a perspective view of the passenger seat module of FIG. 1 showing both the tray table and tray table drawer deployed.
Figure 3:
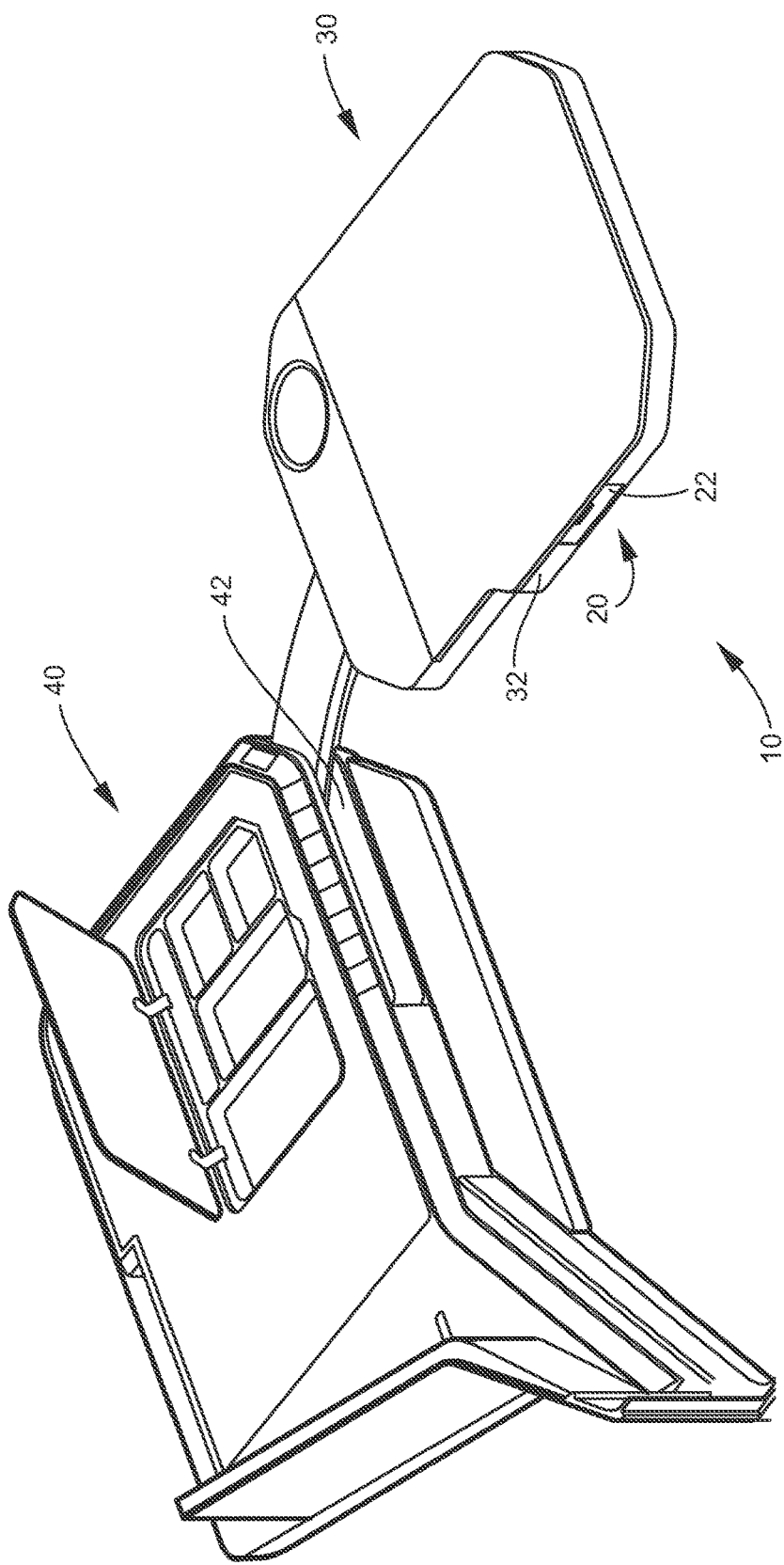
FIG. 3 is a perspective view of the passenger seat module of FIG. 1 showing the tray table deployed and the tray table drawer stowed.

Referring to FIGS. 2 and 3, the tray table assembly 30 includes a tray table 44 coupled to a support arm 46. The tray table 44 includes a table top 48 and a bottom 50 interconnected through a perimeter sidewall 32 so as to provide an internal compartment within the tray table. An opening through a front face of the perimeter sidewall 32 provides access to the internal compartment in which the drawer 20 is stowed. The front wall 22 of the drawer 20 aligns flush with the perimeter sidewall 32 of the tray table 44 when the drawer 20 is in the stowed position.

The end of the support arm 46 opposite the tray table 44 is adapted to be coupled to the passenger seat module 40. The module 40 includes an elongate recess 42 that opens through a face of the module. The tray table 44 stows within the recess 42 and deploys therefrom for use. In the stowed position of the tray table, as shown in FIG. 1, the drawer 20 deploys in a first direction, and in the deployed position of the tray table, as shown in FIG. 2, the drawer 20 deploys in a second direction perpendicular to the first direction. In this configuration, the drawer 20 can be opened regardless of whether the tray table 44 is stowed or deployed.

The recess 42 may open through a side of the module 40, for example, the side of the module facing the passenger seat served by the tray table 44. In this configuration, the drawer 20 can be accessed when the tray table 30 is stowed, and the tray table 44 deploys from a position alongside the passenger seat to an ergonomic position directly forward of the seated passenger. In this configuration the tray table 44 rotates about 90 degrees between the fully stowed and fully deployed positions of the tray table. The tray table 44 may be pivotably coupled to the support arm 46 such that the tray table pivots about a pivot axis at the coupled end of the support arm 46 for adjusting the tray table orientation when deployed.

The module 40 may further include a top compartment 52 accessible through a hinged door 54, imparting additional storage capacity to the module 40. The accessibility of the top compartment 52 is independent of the accessibility of the drawer 20 and of tray table deployment. As such, the separate compartments can be accessed simultaneously or separately, and the compartments can serve different storage needs. Like the drawer 20, the top compartment 52 can be configured with separate internal storage compartments.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A passenger seat module assembly, comprising:
   a module adapted to be positioned in proximity to a passenger seat, the module including a module compartment disposed in a top of the module accessible through a hinged door;
   a support arm coupled at one end to the module;
   a tray table coupled to the support arm, the tray table comprising a table top and a bottom interconnected through a perimeter sidewall so as to provide an internal compartment within the tray table, the tray table movable between a stowed position within the module and a deployed position outside of the module;
   an opening through the perimeter sidewall of the tray table providing access to the internal compartment; and
   a drawer disposed in the internal compartment, the drawer movable between a stowed position within the internal compartment and a deployed position outside of the internal compartment.

2. The module assembly of claim 1, wherein the drawer comprises a bottom, a perimeter sidewall, an open top, and a plurality of internal dividers dividing an interior volume of the drawer into separate compartments.

3. The module assembly of claim 2, wherein the perimeter sidewall of the drawer comprises a front wall comprising a handle for manipulating the drawer between the stowed and deployed positions of the drawer.

4. The module assembly of claim 3, wherein the front wall aligns flush with the perimeter sidewall of the tray table when the drawer is in the stowed position thereof.

5. The module assembly of claim 1, wherein the module comprises an elongate recess accessible through a side of the module, the elongate recess housing the tray table therein when the tray table is in the stowed position, and wherein a front face of the drawer is oriented parallel to the side of the module such that the drawer is configured to open when the tray table is in the stowed and deployed positions of the tray table.

6. The module assembly of claim 1, wherein the tray table rotates 90 degrees between the stowed and deployed positions of the tray table.

7. The module assembly of claim 1, wherein in the stowed position of the tray table the drawer deploys in a first direction, and in the deployed position of the tray table the drawer deploys in a second direction perpendicular to the first direction.

8. The module assembly of claim 1, wherein the drawer slides horizontally between the stowed and deployed positions of the drawer.

9. A passenger seat module assembly, comprising:
   a module adapted to be positioned in proximity to a passenger seat; and
   a tray table coupled to the module, the tray table comprising a table top and a bottom interconnected through a perimeter sidewall so as to provide an internal compartment within the tray table, the tray table movable between a stowed position within the module and a deployed position outside of the module;
   an opening through the perimeter sidewall of the tray table providing access to the internal compartment; and
   a drawer disposed in the internal compartment, the drawer movable between a stowed position within the internal compartment and a deployed position outside of the internal compartment;
   the module comprising an elongate recess accessible through one side of the module, the elongate recess housing the tray table therein when the tray table is in the stowed position, and wherein a front face of the drawer is oriented parallel to the one side of the module such that the drawer is configured to open when the tray table is in each of the stowed and developed position of the tray table.

10. The module assembly of claim 9, further comprising a support arm coupled at one end to the module at an opposing end to the tray table.

11. The module assembly of claim 9, wherein the tray table rotates 90 degrees between the stowed and deployed positions of the tray table.

* * * * *